United States Patent [19]
Ferguson

[11] Patent Number: 5,591,918
[45] Date of Patent: Jan. 7, 1997

[54] PRESSURE GAUGE FOR SEMI-CONDUCTOR PROCESSING

[75] Inventor: Walter J. Ferguson, Waterbury, Conn.

[73] Assignee: Dresser Industries, Inc., Dallas, Tex.

[21] Appl. No.: 584,949

[22] Filed: Jan. 16, 1996

[51] Int. Cl.⁶ .................................................. G01L 7/04
[52] U.S. Cl. ............................................. 73/732; 73/741
[58] Field of Search ........................... 73/732, 741, 742, 73/743, 733, 734, 735

[56] References Cited

U.S. PATENT DOCUMENTS

| | | | |
|---|---|---|---|
| 1,345,630 | 7/1920 | Place | 73/741 |
| 2,181,730 | 11/1939 | Heise | 73/732 X |
| 3,398,584 | 8/1968 | Heise | 73/418 |
| 3,975,967 | 8/1976 | Conti | 73/411 |
| 4,055,085 | 10/1977 | Wetterhorn | 73/418 |
| 4,552,389 | 11/1985 | Babuder et al. | 285/379 |
| 5,000,049 | 3/1991 | Cooper et al. | 73/730 |

Primary Examiner—Richard Chilcot
Assistant Examiner—Joseph L. Felber
Attorney, Agent, or Firm—Daniel Rubin

[57] ABSTRACT

A pressure gauge for semiconductor processing that defines an internal flow path from the socket inlet to the displaceable end of the Bourdon tube that is shelf free so as to be self drainable for internal cleansing and purging whereby to avoid any trapping of contaminants that could subsequently have a deleterious affect on the process.

10 Claims, 1 Drawing Sheet

PRESSURE GAUGE FOR SEMI-CONDUCTOR PROCESSING

FIELD OF THE INVENTION

The field of art to which the invention relates comprises a pressure gauge for semi-conductor processing. The gauge includes a Bourdon tube constructed internally for self drainability that eliminates contaminant trapping so as to avoid having a deleterious affect on a semi-conductor process.

BACKGROUND OF THE INVENTION

Pressure gauges are widely utilized in a myriad of different environments for commercial and industrial applications where affording an indication of fluid pressure values is required. Depending on the instrument, values of pressure can be displayed in either digital or analog form. The primary sensing element of the gauge typically comprise a Bourdon tube having a free end that incurs a predictable displacement in response to pressure changes to which it is exposed. Typically, tube displacement is translated via a movement or amplifier to a rotatable pointer that is displaced opposite a dial of calibrated pressure values.

In semi-conductor fabricating plants, a variety of toxic and corrosive gases are utilized for the etching of silicone wafers. The gases are of supreme purity with contaminants measured in parts per billion. The specific gas flowing through a pipe line at any point in time is frequently changed requiring that extensive flushing and evacuation be deployed to completely remove any remnant of the prior gas from all equipment and accessories. To minimize retention of contaminants, industry imposes supreme material standards such as, for example, the use of super pure stainless steel and electropolished surfaces.

Because the Bourdon tube in a standard pressure gauge comprises a large dead-end cavity it tends to trap contaminants. The effect of trapping in semiconductor processing is to cause a prolonged change over time longer than would otherwise be necessary. At the same time, failure to remove all previous gas particles from a Bourdon tube being utilized can ruin and even destroy etched wafers in the course of being processed.

DESCRIPTION OF THE PRIOR ART

Various approaches toward a contaminant free Bourdon tube in a pressure gauge construction have been attempted as disclosed for example, in U.S. Pat. Nos. 3,398,584 and 5,000,049. Despite prior recognition of the requirement for a contaminant free Bourdon tube, a completely satisfactory solution has not heretofore been known.

OBJECTS OF THE INVENTION

It is an object of the invention to provide a novel Bourdon tube affording enhanced capability for cleaning that avoids contaminant residue from remaining within the tube.

It is a further object of the invention to effect the previous object with a Bourdon tube that eliminates any internal shelving on which contaminants could potentially accumulate.

It is a still further object of the invention to afford the previous objects with a Bourdon tube construction that is economical to fabricate yet does not detract from operating performance.

SUMMARY OF THE INVENTION

This invention relates to a pressure gauge utilizing a Bourdon tube for sensing values of pressure. More specifically, the invention relates to a novel construction of a Bourdon tube that is internally shelfless so as to enable gauge cleansing in a manner that precludes contaminant residue from remaining within the tube.

The foregoing is achieved in accordance with the invention by a Bourdon tube constructed so as to be shelfless and completely self drainable. Providing self drainability are several features including an inlet connection to the gauge socket having a somewhat critical downward slope at an obtuse angle relative to flow axis of the socket; the free displacement end of the Bourdon tube terminates at or before the twelve o'clock position; a constant cross section of the tube at the free end and the use of only two crevice free welds throughout.

Using a VCR™ gland instead of threads for connecting the gauge socket to a selected gauge site further avoids the possibility of contamination in and about the gauge. To compensate for the relatively shorter Bourdon tube, an increased amplifier ratio is utilized as compared to the customary and standard ratio utilized in the industry.

Being that these features can easily be implemented, performance and economy of the Bourdon tube are assured.

The above noted features and advantages of the invention as well as other superior aspects thereof will be further appreciated by those skilled in the art upon reading the detailed description that follows in conjunction with the drawings.

DESCRIPTION OF THE PREFERRED EMBODIMENT

Figure 1:
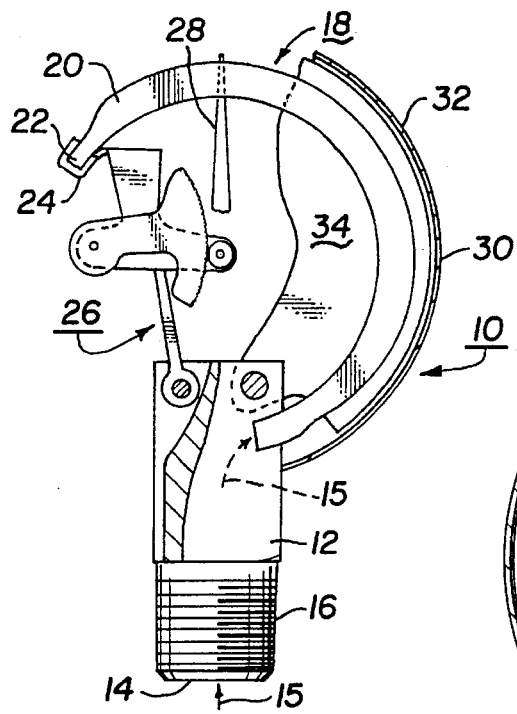
FIG. 1 is a fragmentary elevation of an exemplary prior art pressure gauge utilizing a Bourdon tube.

In the description which follows, like parts are marked throughout the specification and drawings with the same reference numerals respectively. The drawing figures are not necessarily to scale and in certain views, parts may have been exaggerated for purposes of clarity.

Referring now to the drawings, there is illustrated in FIG. 1 a prior art pressure gauge designated 10 that may for example be of a basic type disclosed in U.S. Pat. No. 4,055,085 incorporated herein by reference.

Comprising gauge 10 is a socket 12 having an inlet 14 in which to receive gas flow 15 to be monitored and including threads 16 for connecting the gauge to a system with which it is to be utilized. Gas flow being received is communicated via an internal passage to Bourdon tube 18. This causes free end 20 of the Bourdon tube to incur arcuate displacement in a well known manner in response to incremental pressure changes of the gas. With tube tip 22 connected to bracket channel 24 of amplifier 26, an amplified and correlated motion displaces pointer 28 relative to pressure values on a dial face (not shown). Amplifier 26 typically utilizes a gear ratio of 10:1–12:1 in translating tip displacement to pointer 28. Except for the exposed portions of socket 12, each of the foregoing components are substantially enclosed within a gauge housing 30 having a bezel 32 securing a transparent crystal 34.

Figure 2:
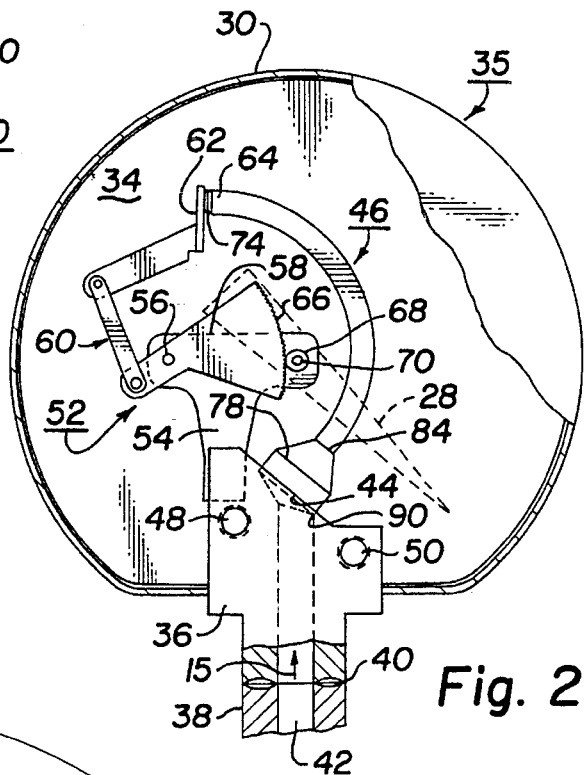
FIG. 2 illustrates the Bourdon tube and gauge connection in accordance with the invention.
Figure 3:
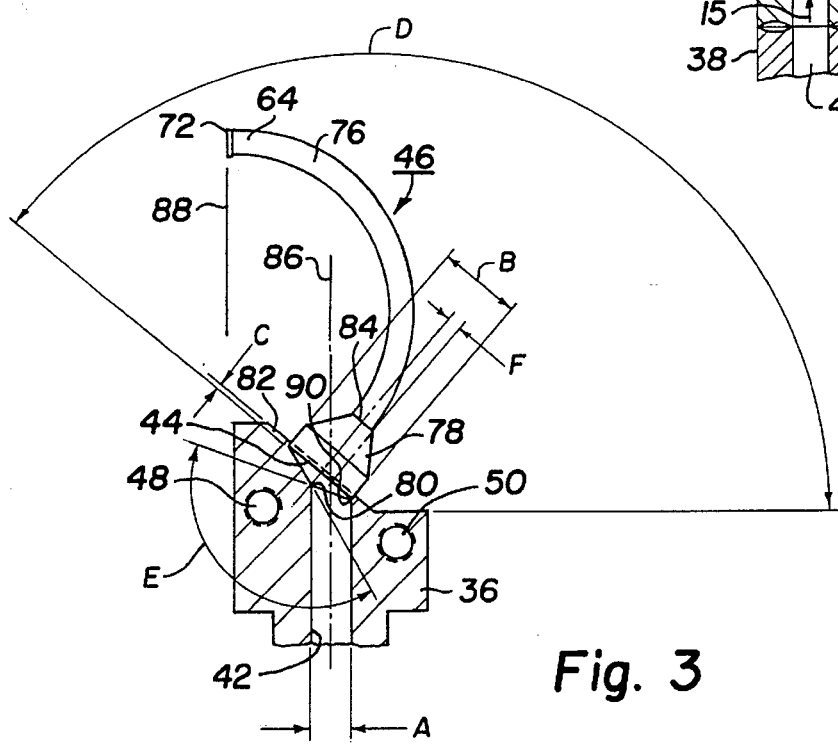
FIG. 3 is a enlarged detailed illustration of the Bourdon tube as utilized in the invention hereof.

Referring now to FIGS. 2 and 3 hereof, the gauge designated 35, includes a socket 36 formed of bar stock and to which a VCR gland 38 of a type commercially available is secured by weld 40. Installation of this arrangement at a selected pressure site is threadless and includes further assembly as disclosed, for example, in U.S. Pat. No. 4,552, 389. Provided in socket 36 is a continuous vertical bore 42 through which incoming gas pressure 15 can enter the inlet 44 of the Bourdon tube here designated 46. Also supported on socket 36 is a stationary type movement or amplifier 52 which may, for example, be of a type disclosed in Heise U.S. Pat. No. 3,975,967. The case 30 is preferably of a "D" configuration enabling it to be positioned relatively closer to the process further minimizing any dead volume and wetted area associated with inlet 42. Threaded apertures 48 and 50 enable mounting of socket 36 to case 30.

The amplifier 52 includes a stationary upright base 54, and a lateral pin 56 on which sector arm 58 is caused to pivot. The free end of the sector arm receives a linkage 60 terminating at an end plate 62 that is secured to the tube end 64 of Bourdon tube 46. The gear end 66 of the sector arm engages a pinion gear 68 on pointer shaft 70 for effecting displacement of pointer 28 in response to displacement of tube end 64. Joining end plate 62 to tube end 64 is a closure tip 72 secured to the Bourdon tube and in turn joined to the plate via a weld 74. Alternatively, plate 62 and closure tip 72 can be integrally formed for attachment to tube end 64 via weld 74. The amplifier ratio for translating tip movement to pointer 28 in this embodiment is about 16:1 for reasons as will be understood. Accomplishing the increased ratio is a changed gearing mesh between sector arm 58 and pinion 68.

Bourdon tube 46 comprises an elongated generally C-shaped length of tubing of oval or elliptical cross-section in the active area 76 of the tube. The inlet 44 is disposed in an enlarged circular end 78 that typically is of the retained raw tubing diameter before the remaining tube sections are drawn to size so as to be integral therewith at a fold joint 84. End 78 is received in a recessed conical well 80 formed in the angled upper face 82 of socket 36 enveloping the opening of bore 42 thereat. As best seen in FIG. 3, the axes of bore 42 and end 78 are offset a distance "F" to internally assure tangential trap-free, self-drainable contact along at least their mutual lower end 90.

The various dimensional relationships indicated in FIG. 3 are not necessarily critical, but rather are deemed exemplary for establishing the shelf free internal construction leading from the inlet bore 42 to the Bourdon tube end tip 72, assuming of course that the axis 86 of bore 42 when cleaning or purging the gauge is in a vertical orientation. It can be seen for these purposes, that the end face of tip 72, as represented by line 88, is parallel to axis 86 so as not to exceed a twelve o'clock relation therewith. Being of a relatively shorter length than the customary Bourdon tube justifies the higher amplifier ratio mentioned supra. The following table exemplifies the dimensions hereof for 100 percent drainability:

| INDEPENDANT VARIABLES | | |
|---|---|---|
| tube bore "B" | tube bore depth "C" | slope of socket face "D" - degrees |
| 0.25 | 0.0122 | 140 |
| 0.27 | 0.0122 | 140 |
| 0.29 | 0.0122 | 140 |
| 0.31 | 0.0122 | 140 |
| 0.33 | 0.0122 | 140 |
| 0.35 | 0.0122 | 140 |
| slope of socket face "D" - radians | included drill point angle "E" - degrees | included drill point angle "E" - radians |
| 2.443 | 141.26 | 2.465 |
| 2.443 | 141.26 | 2.465 |
| 2.443 | 141.26 | 2.465 |
| 2.443 | 141.26 | 2.465 |
| 2.443 | 141.26 | 2.465 |
| 2.443 | 141.26 | 2.465 |
| DEPENDANT VARIABLES | | |
| required inlet bore "A" | required centerline mismatch "F" | |
| 0.1240 | 0.04406 | |
| 0.1339 | 0.04759 | |
| 0.1438 | 0.05111 | |
| 0.1538 | 0.05464 | |
| 0.1637 | 0.05816 | |
| 0.1736 | 0.06169 | |

Utilizing these dimensional relationships in combination with only two crevice free welds at 74 and end 90, assures a shelf-free construction by which the internals of the socket and Bourdon tube can be reliably cleaned and purged, whenever required, without the potential trapping of contaminants at any location within the construction. Being that the entire unit is completely self-drainable of a solvent or other composition utilized for purging the unit prior to introducing a change of gas, uncontaminated purity can be assured of the previous gas, gases, or cleansing composition. By affording this level of reliance, at least the gauge hereof will not contribute to any contamination, failure or other adverse affect that could characterize an improperly processed semiconductor chip. By virtue thereof, the gauge construction constitutes a substantial forward advance in the industry enabling the semi-conductor process to be pressure monitored without adverse affects being attributed to the gauge per se.

Since many changes could be made in the above construction and many apparently widely different embodiments of this invention could be made without departing from the scope thereof, it is intended that all matter contained in the drawings and specification shall be interpreted as illustrative and not in a limiting sense.

I claim:

1. In a pressure gauge having a tubular socket defining an internal bore for connecting to a pressure site at which pressure of a gas is to be monitored, a Bourdon tube extending between ends including a secured end in flow communication with the bore of said socket and a free displacement end displaceable in correlation to pressure changes being monitored at said site, the improvement comprising:

a shelf-free flow path extending from an inlet through said bore to the displaceable end of said Bourdon tube so as to render said flow path self-drainable.

2. A pressure gauge in accordance with claim 1 in which the free end of said Bourdon tube terminates in an end face which in the absence of gas pressure being received extends substantially in a plane at or before a substantially parallel relation to the axis of said bore.

3. A pressure gauge in accordance with claim 2 in which said Bourdon tube comprises tubing of substantially elliptical/oval cross section in at least the active area of said tube, there is included a connecting member between said bore and the secured end of said Bourdon tube, and said connecting member has an inlet of diameter relatively greater than the sectional dimension of said tubing.

4. A pressure gauge in accordance with claim 3 in which said connecting member is reducibly flared from a relatively larger diameter at its inlet to a sealed joinder with said tubing.

5. A pressure gauge in accordance with claim 4 in which said connecting member and tubing where joined are of an integral construction.

6. A pressure gauge in accordance with claim 3 in which said connecting member is secured within a recess defined in an upper surface of said socket enclosing an upper end of said bore.

7. A pressure gauge in accordance with claim 6 in which said upper surface of said socket extends in a plane angularly offset from the inlet axis of said bore.

8. A pressure gauge in accordance with claim 6 in which the axis of said connecting member at its inlet is spatially offset and parallel to an offset intersecting axis of said bore.

9. A pressure gauge in accordance with claim 8 in which said spatial offset enables the lower internal edge of said connecting member to cooperate with the internal bore well surface thereat to provide for continuously smooth trap-free self-drainage.

10. A pressure gauge in accordance with claim 1 in which said socket is threadless for connecting to said pressure site.

* * * * *